United States Patent [19]
Hsu et al.

[11] Patent Number: 6,147,164
[45] Date of Patent: Nov. 14, 2000

[54] TECHNIQUE FOR REDUCING THE COLD FLOW OF RUBBERS

[75] Inventors: Wen-Liang Hsu, Cuyahoga Falls; Adel Farhan Halasa, Bath, both of Ohio

[73] Assignee: The Goodyear Tire & Rubber Company, Akron, Ohio

[21] Appl. No.: 08/874,850

[22] Filed: Jun. 13, 1997

[51] Int. Cl.$^7$ .................................................. C08F 293/00
[52] U.S. Cl. ............................................. 525/314; 526/340
[58] Field of Search ............................. 525/314; 526/337, 526/340

[56] References Cited

U.S. PATENT DOCUMENTS

| | | | |
|---|---|---|---|
| 3,402,159 | 9/1968 | Hsieh . | |
| 3,439,064 | 4/1969 | Makowski et al. . | |
| 3,558,575 | 1/1971 | Keckler . | |
| 5,047,483 | 9/1991 | Halasa et al. ............................ | 525/237 |
| 5,061,765 | 10/1991 | Hsu et al. ................................ | 526/141 |
| 5,137,998 | 8/1992 | Hsu et al. ................................ | 526/174 |
| 5,159,020 | 10/1992 | Halasa .................................... | 526/337 |
| 5,239,009 | 8/1993 | Halasa et al. ........................... | 525/258 |
| 5,272,220 | 12/1993 | Rodgers et al. ....................... | 525/332.3 |
| 5,284,927 | 2/1994 | Hsu ......................................... | 526/174 |
| 5,405,927 | 4/1995 | Hsu et al. ................................ | 526/337 |

FOREIGN PATENT DOCUMENTS

| | | | |
|---|---|---|---|
| 4401934 | 7/1995 | Denmark .......................... | C08L 9/06 |

Primary Examiner—Christopher Henderson
Attorney, Agent, or Firm—Alvin T. Rockhill

[57] ABSTRACT

Cold flow is a problem that is commonly encountered in the handling and storage of low molecular weight linear rubbers, such as low vinyl polybutadiene rubber and isoprene-butadiene rubber. This invention is based upon the unexpected discovery that the cold flow of such rubbery polymers can be greatly reduced by incorporating a small block of polystyrene therein. The rubbery polymers of this invention which exhibit a low level of cold flow can be synthesized by simply terpolymerizing 1,3-butadiene, isoprene and from about 0.5 phm to about 3 phm of styrene under anionic polymerization conditions in the absence of a polar modifier. It is preferred to utilize batch polymerization techniques. However, continuous polymerization techniques can also be utilized. This invention more specifically disclosed a rubbery polymer which is comprised of polymer chains containing repeat units which are derived from 1,3-butadiene, isoprene and from about 0.5 weight percent to about 3 weight percent styrene, wherein the repeat units which are derived from styrene are in blocks at the ends of the polymer chains, wherein the rubbery polymer has a glass transition temperature which is within the range of about −105° C. to about −65° C. and wherein the rubbery polymer has a number average molecular weight which is within the range of about 50,000 to about 600,000.

7 Claims, No Drawings

TECHNIQUE FOR REDUCING THE COLD FLOW OF RUBBERS

BACKGROUND OF THE INVENTION

The replacement cost of tires is one of the major expenses encountered by the trucking industry. Tire replacement cost and frequency is, of course, also of concern to most automobile and light truck owners. In recent years, many modifications have been implemented to improve the treadwear characteristics of tires. However, improvements in tire treadwear characteristics have sometimes been achieved by compromising the traction and/or rolling resistance characteristics of the tire.

In order to reduce the rolling resistance of a tire, rubbers having a high rebound can be utilized in making the tires treads. Tires made with such rubbers undergo less energy loss during rolling and normally also exhibit improved treadwear characteristics. The traditional problem associated with this approach is that the tire's wet traction and wet skid resistance characteristics are compromised. This is because good rolling resistance which favors low energy loss and good traction characteristics which favor high energy loss are viscoelastically inconsistent properties.

In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads. However, such blends are not totally satisfactory for all purposes.

U.S. Pat. No. 5,137,998 discloses a process for preparing a rubbery terpolymer of styrene, isoprene and butadiene having multiple glass transition temperatures and having an excellent combination of properties for use in making tire treads which comprises terpolymerizing styrene, isoprene and 1,3-butadiene in an organic solvent at a temperature of no more than about 40° C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur-cured rubber composition comprised of, based on 100 parts by weight rubber (phr), (A) about 10 to about 90 parts by weight of a styrene, isoprene, butadiene terpolymer rubber (SIBR), and (B) about 70 to about 30 weight percent of at least one of cis 1,4-polyisoprene rubber and cis 1,4-polybutadiene rubber wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about −10° C. to about −40° C. and, further the said bound butadiene structure contains about 30 to about 40 percent 1,2-vinyl units, the said bound isoprene structure contains about 10 to about 30 percent 3,4-units, and the sum of the percent 1,2-vinyl units of the bound butadiene and the percent 3,4-units of the bound isoprene is in the range of about 40 to about 70 percent.

U.S. Pat. No. 5,272,220 discloses a styrene-isoprene-butadiene rubber which is particularly valuable for use in making truck tire treads which exhibit improved rolling resistance and tread wear characteristics, said rubber being comprised of repeat units which are derived from about 5 weight percent to about 20 weight percent styrene, from about 7 weight percent to about 35 weight percent isoprene, and from about 55 weight percent to about 88 weight percent 1,3-butadiene, wherein the repeat units derived from styrene, isoprene and 1,3-butadiene are in essentially random order, wherein from about 25 percent to about 40 percent of the repeat units derived from the 1,3-butadiene are of the cis-microstructure, wherein from about 40 percent to about 60 percent of the repeat units derived from the 1,3-butadiene are of the trans-microstructure, wherein from about 5 percent to about 25 percent of the repeat units derived from the 1,3-butadiene are of the vinyl-microstructure, wherein from about 75 percent to about 90 percent of the repeat units derived from the isoprene are of the 1,4-microstructure, wherein from about 10 percent to about 25 percent of the repeat units derived from the isoprene are of the 3,4-microstructure, wherein the rubber has a glass transition temperature which is within the range of about −90° C. to about −70° C., wherein the rubber has a number average molecular weight which is within the range of about 150,000 to about 400,000, wherein the rubber has a weight average molecular weight of about 300,000 to about 800,000, and wherein the rubber has an inhomogeneity which is within the range of about 0.5 to about 1.5.

U.S. Pat. No. 5,239,009 reveals a process for preparing a rubbery polymer which comprises: (a) polymerizing a conjugated diene monomer with a lithium initiator in the substantial absence of polar modifiers at a temperature which is within the range of about 5° C. to about 100° C. to produce a living polydiene segment having a number average molecular weight which is within the range of about 25,000 to about 350,000 and (b) utilizing the living polydiene segment to initiate the terpolymerization of 1,3-butadiene, isoprene and styrene, wherein the terpolymerization is conducted in the presence of at least one polar modifier at a temperature which is within the range of about 5° C. to about 70° C. to produce a final segment which is comprised of repeat units which are derived from 1,3-butadiene, isoprene and styrene, wherein the final segment has a number average molecular weight which is within the range of about 25,000 to about 350,000. The rubbery polymer made by this process is reported to be useful for improving the wet skid resistance and traction characteristics of tires without sacrificing tread wear or rolling resistance.

U.S. Pat. No. 5,061,765 discloses isoprene-butadiene copolymers having high vinyl contents which can reportedly be employed in building tires which have improved traction, rolling resistance and abrasion resistance. These high vinyl isoprene-butadiene rubbers are synthesized by copolymerizing 1,3-butadiene monomer and isoprene monomer in an organic solvent at a temperature which is within the range of about −10° C. to about 100° C. in the presence of a catalyst system which is comprised of (a) an organoiron compound, (b) an organoaluminum compound, (c) a chelating aromatic amine and (d) a protonic compound; wherein the molar ratio of the chelating amine to the organoiron compound is within the range of about 0.1:1 to about 1:1, wherein the molar ratio of the organoaluminum compound to the organoiron compound is within the range of about 5:1 to about 200:1 and wherein the molar ratio of the protonic compound to the organoaluminum compound is within the range of about 0.001:1 to about 0.2:1.

U.S. Pat. No. 5,405,927 discloses an isoprene-butadiene rubber which is particularly valuable for use in making truck tire treads, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3 percent to about 10 percent of the repeat units in said rubber are 1,2-polybutadiene units, wherein from about 50 percent to about 70 percent of the repeat units in said rubber are 1,4-polybutadiene units, wherein from about 1 percent to about 4 percent of the repeat units in said rubber are 3,4-polyisoprene units, wherein from about 25 percent to about 40 percent of the repeat units in the polymer are 1,4-polyisoprene units, wherein the rubber has a glass transition temperature which is within the range of about −90° C. to about −75° C. and wherein the rubber has a Mooney viscosity which is within the range of about 55 to about 140.

Cold flow is a problem that is commonly encountered in the handling and storage of many low molecular weight linear rubbers utilized in making tire tread compounds. For instance, cold flow is a particular problem with linear polymers having low glass transition temperatures and low molecular weights. Cold flow often presents a problem in isoprene-butadiene rubbers, low vinyl polybutadiene rubbers, medium vinyl polybutadiene rubbers and polyisoprene rubbers having low molecular weights and low glass transition temperatures which are used in making tire treads. These polymers are often crosslinked with divinyl benzene to reduce cold flow. However, this technique for overcoming cold flow can lead to other problems. For example, gelation can occur and polymer inconsistency often results. The crosslinking can also detrimentally change the physical characteristics of the rubbery polymer.

SUMMARY OF THE INVENTION

This invention is based upon the unexpected discovery that the cold flow of rubbery polymers can be greatly reduced by incorporation of a small block of polystyrene therein. This technique does not cause gelation and can be implemented in a highly reproducible process. More importantly, the rubbery polymers which are modified by utilizing this technique possess physical properties that are essentially unaltered from those of the unmodified rubber.

The modified rubbery polymers of this invention can easily be utilized in making tire tread compounds that offer excellent performance characteristics. For example, by utilizing the modified isoprene-butadiene rubbers of this invention in tire tread compounds, treadwear characteristics and rolling resistance can be improved without compromising traction characteristics. The subject invention more specifically discloses a pneumatic tire having an outer circumferential tread wherein said tread is a sulfur-cured rubber composition comprised of, based on 100 parts by weight of rubber, (a) from about 30 to about 80 parts of a modified isoprene-butadiene rubber, wherein said modified isoprene-butadiene rubber is comprised of polymer chains containing repeat units which are derived from 1,3-butadiene, isoprene and from about 0.5 weight percent to about 3 weight percent styrene, wherein the repeat units which are derived from styrene are in blocks at the ends of the polymer chains, wherein the modified isoprene-butadiene rubber has a glass transition temperature which is within the range of about −105° C. to about −65° C. and wherein the rubbery polymer has a number average molecular weight which is within the range of about 50,000 to about 600,000 and (b) from about 20 to about 70 parts of a second rubber selected from the group consisting of high vinyl polybutadiene rubber, medium vinyl polybutadiene rubber and styrene-isoprene-butadiene rubber.

The subject invention also reveals a pneumatic tire having an outer circumferential tread wherein said tread is a sulfur-cured rubber composition comprised of, based on 100 parts by weight of rubber, (a) from about 70 to about 95 parts of a modified isoprene-butadiene rubber, wherein said modified isoprene-butadiene rubber is comprised of polymer chains containing repeat units which are derived from 1,3-butadiene, isoprene and from about 0.5 weight percent to about 3 weight percent styrene, wherein the repeat units which are derived from styrene are in blocks at the ends of the polymer chains, wherein the modified isoprene-butadiene rubber has a glass transition temperature which is within the range of about −105° C. to about −65° C. and wherein the rubbery polymer has a number average molecular weight which is within the range of about 50,000 to about 600,000 and (b) from about 5 to about 30 parts of a second rubber selected from the group consisting of natural rubber, high cis-1,4-polybutadiene rubber having a cis-microstructure content of at least 95 percent and 3,4-polyisoprene rubber.

The present invention also discloses a pneumatic tire having an outer circumferential tread wherein said tread is a sulfur-cured rubber composition comprised of, based on 100 parts by weight of rubber, (a) from about 50 to about 75 parts of a modified isoprene-butadiene rubber, wherein said modified isoprene-butadiene rubber is comprised of polymer chains containing repeat units which are derived from 1,3-butadiene, isoprene and from about 0.5 weight percent to about 3 weight percent styrene, wherein the repeat units which are derived from styrene are in blocks at the ends of the polymer chains, wherein the modified isoprene-butadiene rubber has a glass transition temperature which is within the range of about −105° C. to about −65° C. and wherein the rubbery polymer has a number average molecular weight which is within the range of about 50,000 to about 600,000 and (b) from about 25 to about 50 parts of styrene-butadiene rubber.

The subject invention further discloses a rubbery polymer which exhibits low cold flow characteristics which is comprised of polymer chains containing repeat units which are derived from about 97 weight percent to about 99.5 weight percent of at least one conjugated diolefin monomer and from about 0.5 weight percent to about 3 weight percent styrene, wherein the repeat units which are derived from styrene are in blocks at the ends of the polymer chains, wherein the rubbery polymer has a glass transition temperature which is within the range of about −105° C. to about −65° C. and wherein the rubbery polymer has a number average molecular weight which is within the range of about 50,000 to about 600,000.

The present invention further reveals a process for synthesizing a rubbery polymer which exhibits low cold flow characteristics which comprises polymerizing from about 97 phm to about 99.5 phm of at least one conjugated diolefin monomer and 0.5 phm to about 3 phm of styrene, wherein said polymerization is initiated with an anionic polymerization initiator, wherein said polymerization is carried out in the absence of polar modifiers.

The subject invention also discloses a process for synthesizing a rubbery polymer which exhibits low cold flow characteristics which comprises the steps of (1) polymerizing at least one conjugated diolefin monomer in an organic solvent to a conversion of at least about 99 percent to produce a living rubbery polymer cement, wherein said polymerization is initiated with an anionic polymerization initiator and wherein said polymerization is carried out in the presence of a polar modifier, (2) adding from about 0.5 phm to about 3 phm of styrene to the living rubbery polymer cement and (3) allowing the styrene to polymerize to produce the rubbery polymer which exhibits low cold flow characteristics.

DETAILED DESCRIPTION OF THE INVENTION

The modified rubbery polymers of this invention are synthesized by solution polymerization techniques. These anionic polymerizations are initiated with an anionic polymerization initiator, such as an organolithium compound, and are conducted in an organic solvent. Low vinyl polymers which exhibit low cold flow characteristics can be made by simply polymerizing from about 97 phm (parts by weight per 100 parts by weight of monomer) to about 99.5 phm of at least one conjugated diolefin monomer and 0.5 phm to about 3 phm of styrene, wherein said polymerization is initiated with an anionic polymerization initiator, wherein said polymerization is carried out in the absence of polar modifiers. It is highly preferred to utilize a batch polymerization technique.

It is critical to conduct this polymerization in the absence of significant quantities of polar modifiers to insure that polystyrene blocks form at the ends of the polymer chains. The absence of polar modifiers also causes the rubbery polymer being synthesized to have a low vinyl microstructure and a low glass transition temperature. For example, the repeat units which are derived from 1,3-butadiene in the absence of polar modifiers will typically have a vinyl microstructure content which is within the range of about 6 percent to about 10 percent. Polybutadiene blocks made in the absence of polar modifiers will also have a glass transition temperature which is within the range of about $-105°$ C. to about $-90°$ C.

Rubbery polymers having a medium to high vinyl content can also be made by utilizing a different technique. For example, medium vinyl polybutadiene rubber which exhibits low cold flow characteristics can be synthesized by (1) polymerizing 1,3-butadiene monomer with an anionic initiator in an organic solvent in the presence of a polar modifier to a conversion of at least about 99 percent to produce a living polybutadiene rubber cement, (2) adding from about 0.5 phm to about 3 phm of styrene to the living rubbery polymer cement and (3) allowing the styrene to polymerize to produce the polybutadiene rubber which exhibits low cold flow characteristics.

From about 0.5 weight percent to about 3 weight percent styrene will be incorporated into the rubbery polymers of this invention, based upon the total weight of monomers. It is typically preferred for the modified rubbers of this invention to contain from about 0.5 weight percent to about 2 weight percent styrene. It is most preferred for the rubbery polymers of this invention to contain from about 0.75 weight percent to about 1.25 weight percent styrene.

The inert organic medium which is utilized as the solvent will typically be a hydrocarbon which is liquid at ambient temperatures which can be one or more aromatic, paraffinic or cycloparaffinic compounds. These solvents will normally contain from 4 to 10 carbon atoms per molecule and will be liquids under the conditions of the polymerization. It is, of course, important for the solvent selected to be inert. The term "inert" as used herein means that the solvent does not interfere with the polymerization reaction or react with the polymers made thereby. Some representative examples of suitable organic solvents include pentane, isooctane, cyclohexane, normal hexane, benzene, toluene, xylene, ethylbenzene and the like, alone or in admixture. Saturated aliphatic solvents, such as cyclohexane and normal hexane, are most preferred.

The anionic initiator will typically be a lithium compound, such as an organolithium compound. The organolithium compounds which are preferred are organo monolithium compounds that can be represented by the formula R-Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium and 4-cyclohexylbutyllithium. Organo monolithium compounds, such as alkyllithium compounds and aryllithium compounds, are usually employed. Some representative examples of preferred organo monolithium compounds that can be utilized include ethyllithium, isopropyllithium, n-butyllithium, secondary-butyllithium, normal-hexyllithium, tertiary-octyllithium, phenyllithium, 2-napthyllithium, 4-butylphenyllithium, 4-phenylbutyllithium, cyclohexyllithium, and the like. Normal-butyllithium and secondary-butyllithium are highly preferred lithium initiators.

The amount of lithium initiator utilized will vary from one organolithium compound to another and with the molecular weight that is desired for the rubbery polymer being synthesized. As a general rule in all anionic polymerizations, the molecular weight (Mooney viscosity) of the polymer produced is inversely proportional to the amount of catalyst utilized. An amount of organolithium initiator will be selected to result in the production of a rubber having a number average molecular weight which is within the range of about 50,000 to about 600,000. As a general rule, from about 0.01 phm (parts per hundred parts by weight of monomer) to 1 phm of the organo lithium initiator will be employed. In most cases, from 0.01 phm to 0.1 phm of the lithium initiator will be employed with it being preferred to utilize 0.025 phm to 0.07 phm of the organo lithium compound.

Modified polybutadiene rubbers which are synthesized utilizing the technique of this invention will typically have a number average molecular weight which is within the range of about 50,000 to about 200,000. Modified polyisoprene rubbers which are synthesized utilizing the technique of this invention will typically have a number average molecular weight which is within the range of about 100,000 to about 600,000 and modified isoprene-butadiene rubbers which are synthesized utilizing the technique of this invention will typically have a number average molecular weight which is within the range of about 100,000 to about 600,000. However, the benefits of this invention will be maximized in the case of rubbery polymers having number average molecular weights of less than about 400,000 and glass transition temperatures of less than $-70°$ C. The benefits of this invention are even more clear-cut in the case of rubbery polymers having number average molecular weights of less than 300,000 and glass transition temperatures of less than $-80°$ C.

The modified isoprene-butadiene rubbers which are made utilizing the technique of this invention will typically contain from about 5 weight percent to about 78 weight percent isoprene, from about 20 weight percent to about 92 weight percent butadiene and from about 0.5 weight percent to about 3 weight percent styrene. It is normally preferred for the modified isoprene-butadiene rubbers of this invention to contain from about 15 weight percent to about 45 weight percent isoprene, from about 53 weight percent to about 83 weight percent butadiene and from about 0.5 weight percent to about 2 weight percent styrene. It is generally more preferred for the modified isoprene-butadiene rubbers of this invention to contain from about 24 weight percent to about 37 weight percent isoprene, from about 62 weight percent to about 75 weight percent butadiene and from about 0.75 weight percent to about 1.25 weight percent styrene.

Normally, from about 5 weight percent to about 35 weight percent of the conjugated diene monomer will be charged into the polymerization medium (based upon the total weight of the polymerization medium including the organic solvent and monomers). In most cases, it will be preferred for the polymerization medium to contain from about 10 weight percent to about 30 weight percent monomers. It is typically more preferred for the polymerization medium to contain from about 20 weight percent to about 25 weight percent monomers.

The polymerization will normally be conducted at a temperature which is within the range of about 5° C. to about 100° C. The polymerization temperature will preferably be within the range of about 40° C. to about 90° C. to attain the desired microstructure for the block segment. Temperatures within the range of about 60° C. to about 80° C. are most preferred. The microstructure of repeat units which are derived from polybutadiene are somewhat dependent upon the polymerization temperature. For example, in the polymerization of 1,3-butadiene, it is known that higher temperatures result in lower vinyl contents (lower levels of 1,2-microstructure). Accordingly, the polymerization temperature selected will be determined with the ultimate desired microstructure of the polymer segment being kept in mind.

A wide variety of polar modifiers can be utilized in cases where the polymerization is carried out with a modifier. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like.

The modifier can also be a 1,2,3-trialkoxybenzene or a 1,2,4-trialkoxybenzene. Some representative examples of 1,2,3-trialkoxybenzenes that can be used include 1,2,3-trimethoxybenzene, 1,2,3-triethoxybenzene, 1,2,3-tributoxybenzene, 1,2,3-trihexoxybenzene, 4,5,6-trimethyl-1,2,3-trimethoxybenzene, 4,5,6-tri-n-pentyl-1,2,3-triethoxybenzene, 5-methyl-1,2,3-trimethoxybenzene and 5-propyl-1,2,3-trimethoxybenzene. Some representative examples of 1,2,4-trialkoxybenzenes that can be used include 1,2,4-trimethoxybenzene, 1,2,4-triethoxybenzene, 1,2,4-tributoxybenzene, 1,2,4-tripentoxybenzene, 3,5,6-trimethyl-1,2,4-trimethoxybenzene, 5-propyl-1,2,4-trimethoxybenzene and 3,5-dimethyl-1,2,4-trimethoxybenzene. Dipiperidinoethane, dipyrrolidinoethane, tetramethylethylene diamine, diethylene glycol, dimethyl ether and tetrahydrofuran are representative of highly preferred modifiers. U.S. Pat. No. 4,022,959 describes the use of ethers and tertiary amines as polar modifiers in greater detail.

In the isoprene-butadiene rubbers of this invention, the distribution of repeat units derived from isoprene and butadiene is essentially random. The term "essentially random" as used herein means lacking a definite pattern. However, it is realized that the concentration of repeat units derived from isoprene and butadiene may vary to some degree from one end to the other end of polymer chain. The repeat units which are derived from isoprene or 1,3-butadiene differ from the monomer from which they were derived in that a double bond is consumed by the polymerization reaction.

The polymerization is normally allowed to continue until the monomers are exhausted. In other words, the copolymerization of 1,3-butadiene and isoprene is allowed to continue until the polymerization reaction is complete. In most cases, a monomer conversion of at least about 99 percent will be attained.

After the polymerization has been completed, the rubbery polymer can be recovered from the organic solvent. The rubbery polymer can be recovered from the organic solvent by any means, such as decantation, filtration and centrification. It is often desirable to precipitate the rubbery polymer from the organic solvent by the addition of lower alcohols containing from about 1 to about 4 carbon atoms to the polymer solution. Suitable lower alcohols for precipitation of the rubbery polymer from the polymer cement include methanol, ethanol, isopropyl alcohol, normal-propyl alcohol and t-butyl alcohol. The utilization of lower alcohols to precipitate the rubber from the polymer cement also "kills" the living polymer by inactivating lithium end groups. After the modified rubber is recovered from the solution, steam-stripping can be employed to reduce the level of volatile organic compounds in the modified rubber.

There are valuable benefits associated with utilizing the modified isoprene-butadiene rubbers of this invention in making tire tread compounds. Tire tread compounds can be made using these modified isoprene-butadiene rubbers without the need to blend additional rubbers therein. However, in many cases, it will be desirable to blend the modified isoprene-butadiene rubber with one or more additional rubbers to attain the desired performance characteristics for the tire tread compound.

The modified isoprene-butadiene rubbers of this invention can be compounded utilizing conventional ingredients and standard techniques. For instance, the modified isoprene-butadiene rubber will typically be blended with carbon black and/or silica, sulfur, additional fillers, accelerators, oils, waxes, scorch inhibiting agents, coupling agents and processing aids. In most cases, the modified isoprene-butadiene rubber will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally, from 10 to 150 phr of at least one filler will be utilized in the blend with 30 to 80 phr being preferred. In most cases, at least some carbon black will be utilized in the filler. The filler can, of course, be comprised totally of carbon black. Silica can be included in the filler to improve tear resistance and heat build-up. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the tread compound blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The IBR containing blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers and 0 to 1 phr of scorch inhibiting agents.

To fully realize the total advantages of the blends of this invention, silica can be included in the tread rubber formulation. The processing of the rubber blend is normally conducted in the presence of a sulfur containing organosilicon compound to realize maximum benefits. Examples of suitable sulfur containing organosilicon compounds are of the formula:

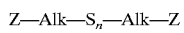  (I)

in which Z is selected from the group consisting of

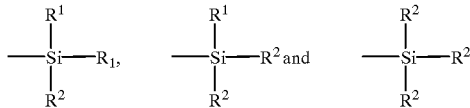

where $R^1$ is an alkyl group of 1 to 4 carbon atoms, cyclohexyl or phenyl; wherein $R^2$ is alkoxy of 1 to 8 carbon atoms, or cycloalkoxy of 5 to 8 carbon atoms; and wherein Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis (dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide and 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis (triethoxysilylpropyl) tetrasulfide. Therefore, as to Formula I, preferably Z is

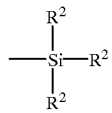

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound of Formula I in a rubber composition will vary depending on the level of silica that is used. Generally speaking, the amount of the compound of Formula I will range from about 0.01 to about 1.0 parts by weight per part by weight of the silica. Preferably, the amount will range from about 0.02 to about 0.4 parts by weight per part by weight of the silica. More preferably, the amount of the compound of Formula I will range from about 0.05 to about 0.25 parts by weight per part by weight of the silica.

In addition to the sulfur containing organosilicon, the rubber composition should contain a sufficient amount of silica and carbon black, if used, to contribute a reasonably high modulus and high resistance to tear. The silica filler may be added in amounts ranging from about 10 phr to about 250 phr. Preferably, the silica is present in an amount ranging from about 50 phr to about 120 phr. If carbon black is also present, the amount of carbon black, if used, may vary. Generally speaking, the amount of carbon black will vary from about 5 phr to about 80 phr. Preferably, the amount of carbon black will range from about 10 phr to about 40 phr. It is to be appreciated that the silica coupler may be used in conjunction with a carbon black (namely, pre-mixed with a carbon black prior to addition to the rubber composition) and such carbon black is to be included in the aforesaid amount of carbon black for the rubber composition formulation. In any case, the total quantity of silica and carbon black will be at least about 30 phr. The combined weight of the silica and carbon black, as hereinbefore referenced, may be as low as about 30 phr, but is preferably from about 45 to about 130 phr.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate; e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designation of Z1165MP and silicas available from Degussa AG with, for example, designations VN2 and VN3.

Tire tread formulations which include silica and an organosilicon compound can be mixed utilizing a thermomechanical mixing technique to attain a better balance of tread compound performance characteristics, for example, traction, treadwear and rolling resistance characteristics. On the other hand, the mixing of the tire tread rubber formulation can be accomplished by conventional methods known to those having skill in the rubber mixing art. For example, the ingredients are typically mixed in at least two stages; namely, at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur containing organosilicon, and carbon black if used, are mixed in one or more non-productive mix stages. The terms "non-productive" and "productive" mix stages are well known to those having skill in the rubber mixing art. In typical non-productive mixing procedures, the mixing is carried out over a total mixing period of only one to three minutes with the rubber mixture being discharged from the mixing equipment at a temperature of no greater than 160° C. When silica and a coupling agent are present, the maximum discharge temperature from the mixing step is normally no greater than about 145° C.

For best results, the sulfur vulcanizable rubber composition containing the sulfur containing organosilicon compound, vulcanizable rubber and generally at least part of the silica should be subjected to a thermomechanical mixing step. The thermomechanical mixing step generally comprises mechanical working in a mixer, mill or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 1 minute to about 20 minutes. It will normally be preferred for the rubber to reach a temperature which is within the range of about 145° C. to about 180° C. and to be maintained at said temperature for a period of time which is within the range of about 2 minutes to about 10 minutes. It will normally be more preferred for the rubber to reach a temperature which is within the range of about 155° C. to about 170° C. and to be maintained at said temperature for a period of time which is within the range of about four minutes to about eight minutes.

The modified isoprene-butadiene rubber containing tire tread compounds of this invention can be used in tire treads in conjunction with ordinary tire manufacturing techniques. Tires are built utilizing standard procedures with the modified isoprene-butadiene diblock rubber simply being substituted for the rubber compounds typically used as the tread rubber. After the tire has been built with the modified isoprene-butadiene rubber containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 175° C. (347° F.). It is more typical for the tires of this invention to be cured at a temperature ranging from about 143° C. (290° F.) to about 165° C. (329° F.). It is generally preferred for the cure cycle used to vulcanize the tires of this invention to have a duration of about 8 to about 20 minutes with a cure cycle of about 10 to 18 minutes being most preferred.

By utilizing the modified isoprene-butadiene rubbers of this invention in tire tread compounds, treadwear characteristics can be improved without compromising traction or rolling resistance. The modified isoprene-butadiene rubbers of this invention can be advantageously utilized in both automobile and truck tire tread compounds. As a general rule, the modified isoprene-butadiene rubber utilized in tire tread compounds will have a single glass transition temperature which is within the range of about −105° C. to about −65° C.

The modified isoprene-butadiene rubbers of this invention can be blended with natural rubber to make tread compounds for passenger tires which exhibit outstanding rolling resistance, traction and tread wear characteristics. The utilization of natural rubber in such blends leads to improved processability. Such blends will normally contain from about 5 to about 30 weight percent natural rubber and from about 70 to about 95 percent of the modified isoprene-butadiene rubber. Such blends will preferably contain from about 20 weight percent to about 30 weight percent natural rubber and about 70 to about 80 weight percent of the modified isoprene-butadiene rubber.

High performance tires which exhibit very exceptional traction characteristics, but somewhat comprised tread wear, can be prepared by blending the modified isoprene-butadiene rubber with solution or emulsion styrene-butadiene rubber (SBR). Such blends will normally contain from about 50 weight percent to about 75 weight percent of the modified isoprene-butadiene rubber and from about 25 weight percent to about 50 weight percent of the solution or emulsion styrene-butadiene rubber. It is typically preferred for such blends to contain from about 55 weight percent to about 65 weight percent of the modified isoprene-butadiene rubber and from about 35 weight percent to about 45 weight percent of the solution or emulsion styrene-butadiene rubber.

In cases where tread wear is of greater importance than traction, from about 5 to about 30 weight percent high cis-1,4-polybutadiene can be blended with about 70 to about 95 weight percent of the modified isoprene-butadiene rubber. Such blends will preferably contain from about 20 weight percent to about 30 weight percent of the high cis-1,4-polybutadiene rubber and from about 70 weight percent to about 80 weight percent of the modified isoprene-butadiene rubber.

In another scenario, the modified isoprene-butadiene rubber of this invention can be used to improve the traction, tread wear and rolling resistance of automobile tires made therewith by including 3,4-polyisoprene in the blend. Such a blend will typically contain from about 5 to about 30 weight percent 3,4-polyisoprene and from about 70 to about 95 weight percent of the modified isoprene-butadiene rubber. Such blends will normally contain from about 20 weight percent to about 30 weight percent of the 3,4-polyisoprene and from about 70 weight percent to about 80 weight percent of the modified isoprene-butadiene rubber.

The 3,4-polyisoprene employed in such blends can be synthesized by the technique disclosed in U.S. Pat. No. 5,239,023. This technique for producing 3,4-polyisoprene involves: (1) adding a catalyst system which is comprised of (a) an organoiron compound which is soluble in the organic solvent, wherein the iron in the organoiron compound is in the +3 oxidation state, (b) a partially hydrolyzed organoaluminum compound, which was prepared by adding a protonic compound selected from the group consisting of water, alcohols and carboxylic acids to the organoaluminum compound, and .(c) a chelating aromatic amine; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1 to a polymerization medium containing isoprene monomer and an organic solvent and (2) allowing the isoprene monomer to polymerize at a temperature which is within the range of about −10° C. to about 100° C. Another representative example of a 3,4-polyisoprene rubber which can be employed in the automobile tire tread compounds of this invention is sold by Huels AG under the tradename Vestogrip® A6001.

Truck tire tread compounds are typically prepared by blending from about 5 to about 30 weight percent of natural rubber and/or high cis-1,4-polybutadiene with about 70 to about 95 weight percent of the modified isoprene-butadiene rubber. High cis-1,4-polybutadiene which is suitable for use in such blends can be made by the process described in Canadian Patent 1,236,648. High cis-1,4-polybutadiene rubber which is suitable for employment in such blends is also sold by The Goodyear Tire & Rubber Company as Budene® 1207 polybutadiene rubber and Budene® 1208 polybutadiene rubber. The high cis-1,4-polybutadiene rubber will typically have a cis-microstructure content of at least 95 percent.

Treads for high performance tires can also be made by blending from about 30 weight percent to about 80 weight percent of the modified isoprene-butadiene rubber with about 20 weight percent to about 70 weight percent of high vinyl polybutadiene rubber having a vinyl content of 60 to about 90 percent. Better traction characteristics can normally be realized by incorporation of a higher level of high vinyl polybutadiene rubber into the blend. It is accordingly normally preferred to blend from about 50 weight percent to about 70 weight percent of the modified isoprene-butadiene rubber with about 30 weight percent to about 50 weight percent of the high vinyl polybutadiene rubber. It is generally more preferred to blend from about 55 weight percent to about 65 weight percent of the modified isoprene-butadiene rubber with about 35 weight percent to about 45 weight percent of the high vinyl polybutadiene rubber. The high vinyl polybutadiene rubber will typically have a vinyl content which is within the range of about 60 percent to about 80 percent.

Treads for high performance tires can also be made by blending medium vinyl polybutadiene rubber with the modified isoprene-butadiene rubber in cases where better rolling resistance is demanded. The medium vinyl polybutadiene rubber utilized in such cases has a vinyl content which is within the range of about 30 percent to 59 percent. The medium vinyl polybutadiene rubber preferably has a vinyl content which is within the range of about 40 percent to about 50 percent. For instance, treads for high performance tires can be made by blending from about 30 weight percent to about 80 weight percent of the modified isoprene-butadiene rubber with about 20 weight percent to about 70 weight percent of medium vinyl polybutadiene rubber. It is normally preferred to blend from about 50 weight percent to about 70 weight percent of the modified isoprene-butadiene rubber with about 30 weight percent to about 50 weight percent of the medium vinyl polybutadiene rubber. It is generally more preferred to blend from about 55 weight percent to about 65 weight percent of the modified isoprene-butadiene rubber with about 35 weight percent to about 45 weight percent of the medium vinyl polybutadiene rubber.

Treads for high performance automobile tires can also be made by blending styrene-isoprene-butadiene rubber (SIBR) with the modified isoprene-butadiene rubber. Such blends will normally contain from 30 weight percent to about 80 weight percent of the modified isoprene-butadiene rubber and from about 20 to about 70 weight percent of the SIBR. It is normally preferred to blend from about 50 weight percent to about 70 weight percent of the modified isoprene-butadiene rubber with about 30 weight percent to about 50 weight percent of the SIBR. It is generally more preferred to blend from about 55 weight percent to about 65 weight percent of the modified isoprene-butadiene rubber with about 35 weight percent to about 45 weight percent of the SIBR. The SIBR utilized in such tire tread compounds will typically have a glass transition temperature which is within the range of about −40° C. to about −20° C.

For purposes of this patent application, polymer microstructures are determined by nuclear magnetic resonance spectrometry (NMR). Glass transition temperatures (Tg) are determined by differential scanning calorimetry at a heating rate of 10° C. per minute and molecular weights are determined by gel permeation chromatography (GPC).

This invention is illustrated by the following examples which are merely for the purpose of illustration and are not to be regarded as limiting the scope of the invention or the manner in which it can be practiced. Unless specifically indicated otherwise, all parts and percentages are given by weight.

COMPARATIVE EXAMPLE 1

In this experiment, an isoprene-butadiene rubber was prepared utilizing an n-butyllithium catalyst without using any polar modifier. In the procedure used, 2,000 grams of a silica/molecular sieve/aluminum dried premix containing 19.8 weight percent of isoprene and 1,3-butadiene in hexanes was charged into a one-gallon (3.8 liters) reactor. The isoprene to 1,3 butadiene ratio was 30:70. After the impurity of the premix was removed by an n-butyl lithium (n-BuLi) solution, 1.38 ml (milliliters) of a 0.96 M solution of n-BuLi (in hexane) were added to the reactor. The target Mn (number averaged molecular weight) was 300,000. The polymerization was allowed to proceed at 70° C. for three hours. The analysis of the residual monomer indicated that the polymerization was completed. Then, 2.0 ml of a 2 M solution of ethanol (in hexane) was added to the reactor to shortstop the polymerization and the polymer was removed from the reactor and stabilized with 1 phr (parts per 100 parts by weight of rubber) of antioxidant.

After the hexane solvent was evaporated, the resulting polymer was dried in a vacuum oven at 50° C. The isoprene-butadiene rubber was determined to have a Tg (glass transition temperature) at −87° C. It was also determined to have a microstructure which contained 6 percent 1,2-polybutadiene units, 64 percent 1,4-polybutadiene units, 28 percent 1,4-polyisoprene units and 2 percent 3,4-polyisoprene units. The Mooney viscosity (ML-4) of the isoprene-butadiene rubber made was determined to be 83. The molecular weight of this isoprene-butadiene rubber was measured using GPC (gel permeation chromatography) to have a Mn of 313,000 and a Mw (weight averaged molecular weight) of 332,000 and a molecular weight distribution (MWD) of 1.06. The cold flow of this rubber was determined to be 8.07 mg/min (milligrams per minute) at 50° C.

EXAMPLES 2–4

The procedure described in Example 1 was utilized in these examples except that the styrene monomer (in amounts of 1 percent, 2 percent and 5 percent of the total monomer) was added to the isoprene-butadiene premix. The GC (gas chromatograph) analysis of residual monomer indicated that the stryene was present in a block at the end of the polymer chains. The Mooney viscosities (ML-4) and cold flow values at 50° C. of these polymers are listed in Table 1.

TABLE 1

| Example | Styrene Content (%) | ML-4 | Cold Flow |
|---|---|---|---|
| 1 | 0 | 83 | 8.07 |
| 2 | 1 | 87 | 4.52 |
| 3 | 2 | 80 | 4.59 |
| 4 | 5 | 84 | 4.62 |

EXAMPLE 5

The 30/70 isoprene-butadiene rubber containing 1 percent styrene for reduced cold flow characteristics was synthesized in a two-reactor (10 liters each) continuous system at 90° C. A dried premix containing isoprene, 1,3-butadiene and styrene in hexanes was charged into the first polymerization reactor continuously at a rate of 65.6 grams/minute. The premix monomer solution contained a ratio of isoprene to 1,3-butadiene to styrene of 30:70:1 and had a total monomer concentration of 14 weight percent. Polymerization was initiated by adding a 0.128 M solution of n-BuLi (normal butyl lithium) in hexanes into the first reactor at a rate of 0.2 grams/minute. The resulting polymerization medium was continuously pushed into the second reactor to continue the polymerization. The residence time for both reactors was set at 90 minutes to achieve complete monomer conversion in the second reactor. The polymer cement was then continuously pushed over to a holding tank containing the shortstop (methanol) and an antioxidant. The resulting polymer cement was then stream-stripped and the recovered rubber was dried in an oven at 60° C. The polymer was determined to have a glass transition temperature at −85° C.

It was also determined to have a microstructure which contained 7 percent 1,2-polybutadiene units, 62 percent 1,4-polybutadiene units, 28 percent 1,4-polyisoprene units, 2 percent 3,4-polyisoprene units and 1 percent polystyrene unit. The molecular weight of this rubber was measured using GPC to have an Mn of 169,500 and Mw (weight average molecular weight) of 335,000 and a molecular weight distribution of 1.98. The ML-4 and cold flow values were determined to be 85 and 2.13 mg/min, respectively.

COMPARATIVE EXAMPLE 6

The procedure described in Example 5 was utilized in this example except that styrene monomer was not added to the isoprene-1,3-butadiene monomer premix. The cold flow value at 50° C. and ML-4 of this rubber is listed in Table 2.

COMPARATIVE EXAMPLE 7

The procedure described in Example 5 was utilized in this example except that styrene monomer was not added to the isoprene-1,3-butadiene monomer premix and a crosslinking agent, DVB (divinylbenzene) in the amount of 0.1 molar ratio to n-BuLi was added to the premix. The cold flow value at 50° C. and ML-4 of this rubber is also listed in Table 2.

TABLE 2

| Example | Styrene Content (%) | DVB | ML-4 | Cold Flow* (mg/min) |
|---|---|---|---|---|
| 5 | 1 | no | 85 | 2.13 |
| 6 | 0 | no | 95 | 2.62 |
| 7 | 0 | yes | 95 | 2.25 |

*Measured at 50° C.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A rubbery polymer which exhibits low cold flow characteristics which is comprised of polymer chains containing repeat units which are derived from about 97 weight percent to about 99.5 weight percent of at least one conjugated diolefin monomer and from about 0.5 weight percent to about 3 weight percent styrene, wherein the repeat units which are derived from styrene are in blocks at the ends of the polymer chains, wherein the rubbery polymer has a glass transition temperature which is within the range of about −105° C. to about −65° C. and wherein the rubbery polymer has a number average molecular weight which is within the range of about 50,000 to about 600,000.

2. A rubbery polymer as specified in claim 1 wherein said rubbery polymer contains repeat units which are derived from about 5 weight percent to about 78 weight percent isoprene, and from about 20 weight percent to about 92 weight percent 1,3-butadiene.

3. A rubbery polymer as specified in claim 2 wherein said rubbery polymer has a number average molecular weight of less than about 400,000 and a glass transition temperature of less than about −70° C.

4. A rubbery polymer as specified in claim 3 wherein said rubbery polymer contains repeat units which are derived from about 15 weight percent to about 46 weight percent isoprene, and from about 53 weight percent to about 83 weight percent 1,3-butadiene.

5. A rubbery polymer as specified in claim 4 wherein said rubbery polymer has a number average molecular weight of less than about 300,000 and a glass transition temperature of less than about −80° C.

6. A rubbery polymer as specified in claim 5 wherein said rubbery polymer contains repeat units which are derived from about 24 weight percent to about 37 weight percent isoprene, from about 62 weight percent to about 75 weight percent 1,3-butadiene and from about 0.75 weight percent to about 1.25 weight percent styrene.

7. A rubbery polymer as specified in claim 2 wherein the distribution of repeat units which are derived from isoprene and 1,3-butadiene are essentially random.

* * * * *